(12) United States Patent
Chen et al.

(10) Patent No.: US 12,407,284 B2
(45) Date of Patent: Sep. 2, 2025

(54) FIELD ORIENTED CONTROL WITH ADAPTIVE START

(71) Applicant: Texas Instruments Incorporated, Dallas, TX (US)

(72) Inventors: Johnson Chen, Shenzhen (CN); Angela Zou, Shanghai (CN)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 87 days.

(21) Appl. No.: 18/327,038

(22) Filed: May 31, 2023

(65) Prior Publication Data

US 2024/0405703 A1 Dec. 5, 2024

(51) Int. Cl.
*H02P 1/46* (2006.01)
*H02P 21/00* (2016.01)
*H02P 21/10* (2016.01)
*H02P 21/18* (2016.01)

(52) U.S. Cl.
CPC .......... *H02P 21/10* (2013.01); *H02P 21/0007* (2013.01); *H02P 21/18* (2016.02)

(58) Field of Classification Search
CPC ...... H02P 21/10; H02P 21/18; H02P 21/0007; H02P 21/22; H02P 6/21; H02P 21/0021; H02P 21/00; H02P 8/12
See application file for complete search history.

(56) References Cited

FOREIGN PATENT DOCUMENTS

KR        20140133783 A    * 11/2014

* cited by examiner

*Primary Examiner* — Karen Masih
(74) *Attorney, Agent, or Firm* — Carl G. Peterson; Frank D. Cimino

(57) ABSTRACT

In described examples, a device includes a processor and a non-transitory memory storing instructions that, when executed, cause the processor to operate in an open loop mode a motor that includes a rotor and a stator. An angle error of the rotor is determined. In response to the angle error of the rotor being less than a threshold, the processor transitions from operating the motor in the open loop mode to operating the motor in a closed loop mode by changing from using a first coordinate system based on a command rotor position to using a second coordinate system based on an estimated rotor position to determine current vectors used to control the motor; and holding constant a current vector used to control the motor while performing the changing action. After performing the changing and holding actions, the processor operates the motor in the closed loop mode.

20 Claims, 6 Drawing Sheets

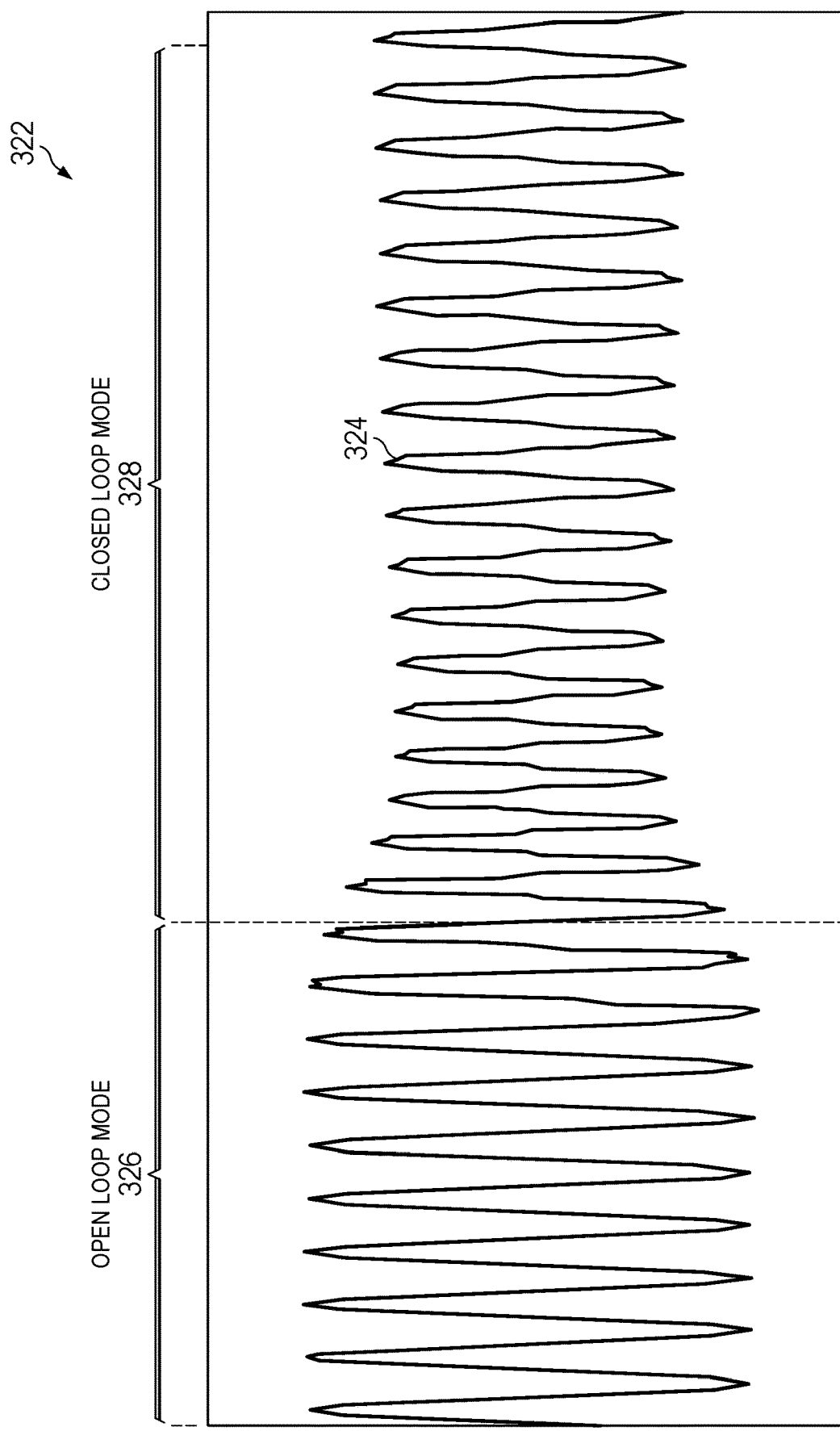

FIELD ORIENTED CONTROL WITH ADAPTIVE START

TECHNICAL FIELD

This application relates generally to field oriented control (FOC) for motors, and more particularly to startup of motors using FOC.

BACKGROUND

In some examples, a motor is a permanent magnet motor. In some examples, a permanent magnet motor includes a fixed stator that causes rotation of a movable rotor. The rotor includes multiple magnets embedded in or connected to the rotor. The stator includes multiple conductive windings. Electrical signals through the windings generate a rotating magnetic field that interacts with the magnets of the rotor, causing the rotor to rotate. Controlling variation of the electrical signals controls the rotating magnetic field, and accordingly, controls rotation of the rotor.

In some examples, FOC control of an AC motor is sensorless. Sensorless motor control is performed by mathematically deriving one or more characteristics of a motor, such as motor speed and rotor position. In some examples, sensorless motor control avoids the use of separate speed and position sensors that are mechanically attached to a motor. Sensors directly attached to a motor can detrimentally affect the performance of the motor, such as by reducing a maximum torque output per volume and drive system reliability. Additional disclosure relating to FOC control of a motor system can be found in commonly assigned U.S. Pat. No. 10,666,180, entitled "Adaptive Torque Disturbance Cancellation for Electric Motors," granted May 26, 2020, which is incorporated herein by reference in its entirety.

SUMMARY

In described examples, a device includes a processor and a non-transitory memory storing instructions that, when executed, cause the processor to operate in an open loop mode a motor that includes a rotor and a stator. An angle error of the rotor is determined. In response to the angle error of the rotor being less than a threshold, the processor transitions from operating the motor in the open loop mode to operating the motor in a closed loop mode by changing from using a first coordinate system based on a command rotor position to using a second coordinate system based on an estimated rotor position to determine current vectors used to control the motor; and holding constant a current vector used to control the motor while performing the changing action. After performing the changing and holding actions, the processor operates the motor in the closed loop mode.

BRIEF DESCRIPTION OF THE DRAWINGS

FIG. 3B is a graph illustrating an example waveform of a phase current during startup of the permanent magnet motor of FIG. 1, in which transition from open loop mode to closed loop mode uses constant control current vector $I_S$ as described with respect to FIG. 3A.

DETAILED DESCRIPTION

Figure 1:
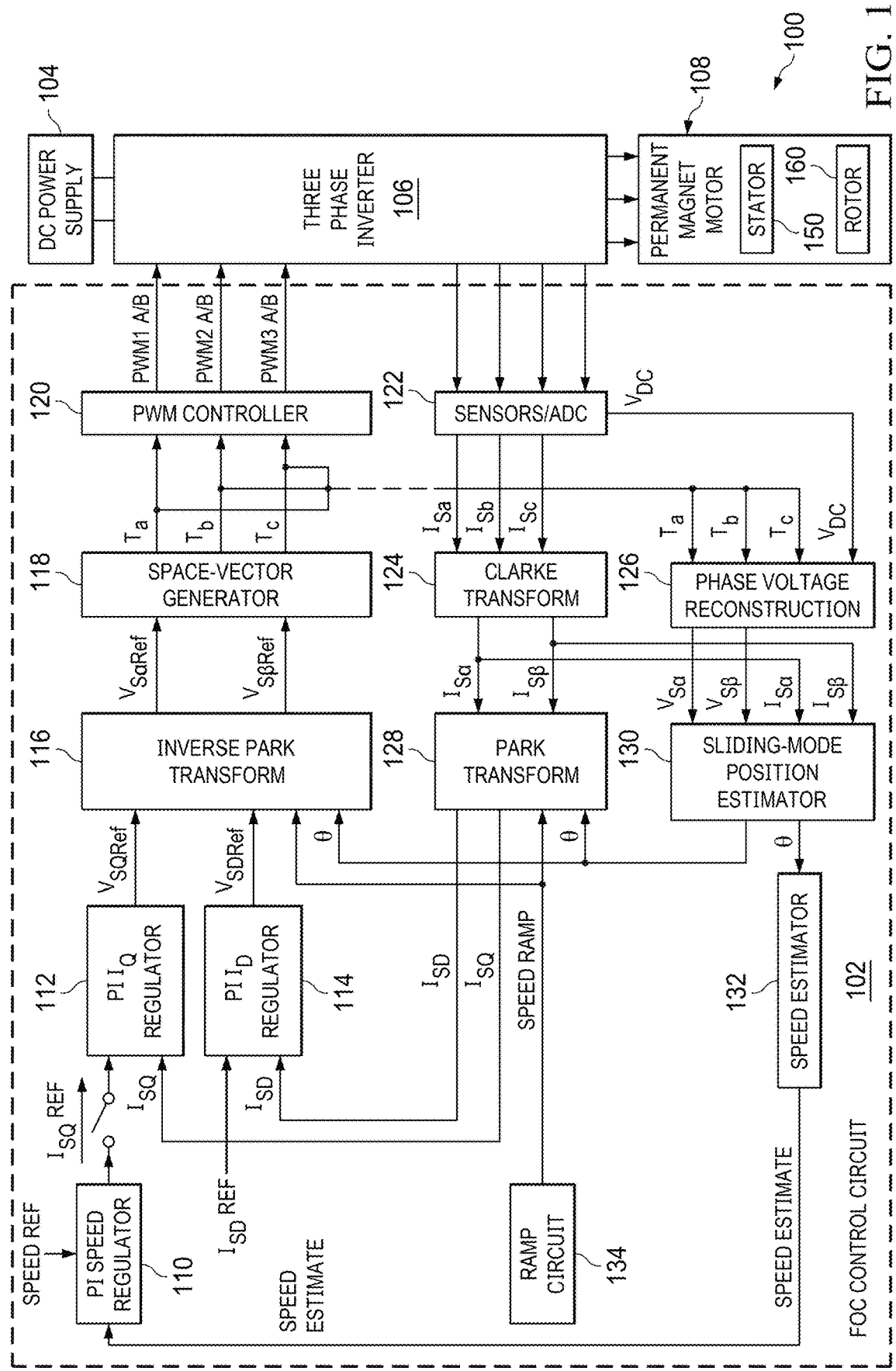
FIG. 1 is a functional block diagram of an example permanent magnet motor system with an FOC control circuitry.

In some examples, as detailed later (for instance, in the permanent magnet motor system 100 of FIG. 1), an FOC control circuitry 102 controlling a permanent magnet motor 108 uses measurements of a back-electromagnetic force (BEMF) waveform induced by the permanent magnet motor 108 to generate feedback signals as part of the control function. BEMF is generated by interaction between magnets of a rotor 160 of the permanent magnet motor 108 and conductive windings of a stator 150 of the permanent magnet motor 108. In some examples, the feedback signals generated using BEMF waveform measurements include a rotor position estimate and a rotor speed estimate.

In some examples, the performance of a permanent magnet motor 108 controlled using FOC is reduced at low rotor speeds due to a low signal-to-noise (SNR) ratio of the BEMF signals generated by the permanent magnet motor 108. Low-SNR BEMF signals reduce the accuracy of angular speed and position estimates that depend on BEMF waveform measurements. Accordingly, in some examples, at low rotor speeds, a permanent magnet motor 108 is controlled using an open loop (no feedback) functionality of the FOC control circuitry 102. Open loop control relies on a command rotor position and an external rotor speed input to determine current vectors applied to control the permanent magnet motor 108. A command rotor position is an angle at which force is applied by the stator 150 to the rotor 160 and can be referred to as a force angle.

The FOC control circuitry 102 switches over to closed loop (feedback-dependent) operation once the rotor 160 reaches a speed threshold. In closed loop mode, the FOC control circuitry 102 uses the rotor speed input, as well as estimated rotor position (e.g., an estimated angle position) and estimated speed feedback signals, to determine current vectors applied to control the permanent magnet motor 108. An estimated rotor position is an angle of the rotor 160 determined using a sliding-mode observer. The sliding-mode observer operates using sliding-mode control concepts. Sliding mode control is a nonlinear control method that uses set-valued control signals to cause a system to "slide" along a cross-section of the normal behavior of the system. In some examples, another type of observer, such as a Luenberger observer, is used to determine estimated rotor position and estimated speed.

In some examples, a current vector applied to control of the motor is expressed in a coordinate system (also referred to as a reference frame) based on the command rotor position during open loop operation. In some examples, these are rotating coordinate systems. On switchover to closed loop operation, this current vector is directly changed to a current vector with the same angle and same magnitude, but with respect to a different coordinate system: a coordinate system based on the estimated rotor position. (See FIGS. 2A and 2B.) Because the command rotor position and the estimated rotor position can be different, the applied current vector can suddenly change on switchover from open loop to closed loop, introducing instability into the motor system.

FOC control sets a current vector to control the motor so that a rotating flux is generated in the motor to apply a desired torque to efficiently control the rotor to spin at a speed corresponding to the rotor speed input. If the current vector changes suddenly, the new current vector may cause an incorrect rotating flux to be generated, which may apply to the rotor undertorque, overtorque, or torque counter to the intended rotation direction. A sudden change in the current vector can cause an unstable transition from open loop to closed loop. This can lead to over-current, high current ripple, torque ripple, or rotor demagnetization. Also, under high load, it can lead to motor startup failure.

An example system can avoid the preceding issues by ramping the commanded speed of the rotor until a difference (error) between the estimated rotor position and the command rotor position is less than a threshold, and then switching from open loop to closed loop operation. On switchover, a control current vector is kept constant while a control coordinate system is switched from one based on the command rotor position to one based on the rotor position estimate.

FIG. 1 is a functional block diagram of an example permanent magnet motor system 100. Although this disclosure describes system 100 as including a permanent magnet motor, the techniques of this disclosure can be implemented with other types of motors such as induction motors or synchronous motors. The permanent magnet motor system 100 includes the FOC control circuitry 102, a direct-current (DC) power supply 104, a three phase inverter 106, and the permanent magnet motor 108. The FOC control circuitry 102 includes a proportional integral (PI) speed regulator 110, a PI $I_Q$ regulator 112, a PI $I_D$ regulator 114, an inverse Park transform circuit 116, a space-vector generator 118, a pulse width modulation (PWM) controller 120, a sensors/analog-to-digital (ADC) circuit 122, a Clarke transform circuit 124, a phase voltage reconstruction circuit 126, a Park transform circuit 128, a sliding-mode position estimator 130, a speed estimator 132, and a ramp circuit 134. In some examples, the FOC control circuitry 102 can be used to control a permanent magnet motor in a vehicle (such as an electric vehicle, electric scooter or bicycle), HVAC (heating, ventilation, and air conditioning) system, pump, actuator, compressor, or robot.

Herein, current signals are named I-subscript-[name], and voltage signals are named V-subscript-[name]. For signals in the DQ coordinate system, D axis signals include D in their name, and Q axis signals include Q in their name. Similarly, for signals in the αβγ (alpha-beta-gamma) coordinate system, α axis signals include a in their name, and β axis signals include β in their name.

The PI speed regulator 110 receives, at a first input, a speed reference signal (Speed Ref) used to set a speed of the permanent magnet motor 108. A second input of the PI speed regulator 110 is connected to an output of the speed estimator 132 to receive a speed estimate signal (Speed Estimate) as a feedback value. A first input of the PI $I_Q$ regulator 112 is switchably connected to receive an $I_{SQ}$ reference ($I_{SQ}$ Ref) at a first input if the permanent magnet motor system 100 is in an open loop mode (also referred to herein as open loop operation). Open loop mode is used during, for example, startup of the permanent magnet motor 108. The first input of the PI $I_Q$ regulator 112 is switchably connected to an output of the PI speed regulator 110 while the permanent magnet motor system 100 is in a closed loop mode (also referred to herein as closed loop operation). Closed loop mode is used after the permanent magnet motor 108 is spinning at a rate sufficient to enable accurate use of estimated speed and estimated position (rotor angle, or θ (theta)) to control three phase power provided to the permanent magnet motor 108. Switchover from open loop mode to closed loop mode is further described with respect to FIGS. 2A through 4. A second input of the PI $I_Q$ regulator 112 is connected to a first output of the Park transform circuit 128 to receive $I_{SQ}$.

A first input of the PI $I_D$ regulator 114 receives an $I_{SD}$ reference ($I_{SD}$ Ref). A second input of the PI ID regulator 114 is connected to a second output of the Park transform circuit 128 to receive $I_{SD}$. A first input of the inverse Park transform circuit 116 is connected to an output of the PI $I_Q$ regulator 112 to receive $V_{SQRef}$. A second input of the inverse Park transform circuit 116 is connected to an output of the PI ID regulator 114 to receive $V_{SDRef}$. A third input of the inverse Park transform circuit 116 is connected to an output of the ramp circuit 134 to receive a Speed Ramp signal, which is used during open loop operation. A fourth input of the inverse Park transform circuit 116 is connected to an output of the sliding-mode position estimator 130 to receive a θ signal, which is used during closed loop operation.

A first input of the space-vector generator 118 is connected to a first output of the inverse Park transform circuit 116 to receive $V_{S\alpha Ref}$. A second input of the space-vector generator 118 is connected to a second output of the inverse Park transform circuit 116 to receive $V_{S\beta Ref}$. First, second, and third inputs of the PWM controller 120 are respectively connected to first, second, and third outputs of the space-vector generator 118 to respectively receive $T_a$, $T_b$, and $T_c$ voltage vector signals. $T_a$, $T_b$, and $T_c$ are used to determine duty cycles of signals generated by the PWM controller 120.

Power and ground inputs of the three phase inverter 106 are respectively connected to power and ground outputs of the DC power supply 104. First, second, and third control inputs of the three phase inverter 106 are connected to first, second, and third outputs of the PWM controller 120 to receive PWM control signals PWM1 A/B, PWM2 A/B, and PWM3 A/B. In some examples, the control inputs of the PWM controller 120 are each pairs of inputs (for A and B signals), and the outputs of the PWM controller 120 are similarly pairs of outputs. The three phase inverter 106 converts DC power received from the DC power supply 104 to three phase AC power in response to the PWM control signals received from the PWM controller 120. First phase, second phase, and third phase control inputs of the permanent magnet motor 108 are respectively connected to first phase, second phase, and third phase outputs of the three phase inverter 106.

In some examples, the permanent magnet motor 108 includes a rotor 160 with permanent magnets embedded in or connected to the rotor 160. The permanent magnet motor 108 also includes a stator 150 with multiple teeth around which conductive windings are wound. The windings are selectively energized and de-energized, based on the signals from the inverter 106, to create a rotating magnetic field to which the rotor magnets response, causing the rotor 160 to rotate. As further described below, the permanent magnet motor 108 generates a BEMF waveform. The sensors/ADC circuit 122 measures this BEMF waveform as part of generating feedback signals used to control the permanent magnet motor system 100.

First, second, and third inputs of the Clarke transform circuit 124 are connected to first, second, and third outputs of the sensors/ADC circuit 122 to receive $I_{sa}$, $I_{sb}$, and $I_{sc}$. First, second, and third inputs of the phase voltage reconstruction circuit 126 are connected to first, second, and third outputs of the space-vector generator 118 to receive $T_a$, $T_b$, and $T_c$ voltage vector signals. A fourth input of the phase voltage reconstruction circuit 126 is connected to a fourth output of the sensors/ADC circuit 122 to receive VDC. VDC is the DC bus voltage, that is, the voltage of the DC power supply 104.

First and second inputs of the sliding-mode position estimator 130 are connected to first and second outputs of the phase voltage reconstruction circuit 126 to receive $V_S\alpha$ and $V_S\beta$. Third and fourth inputs of the sliding-mode position estimator 130 are connected to first and second outputs of the Clarke transform circuit 124 to receive $I_S\alpha$ and $I_S\beta$. First and second inputs of the Park transform circuit 128 are connected to first and second outputs of the Clarke transform circuit 124 to receive $I_S\alpha$ and $I_S\beta$. A third input of the Park transform circuit 128 is connected to an output of the ramp circuit 134 to receive the Speed Ramp signal. A fourth input of the Park transform circuit 128 is connected to an output of the sliding-mode position estimator 130 to receive the θ signal. An input of the speed estimator 132 is connected to an output of the sliding-mode position estimator 130 to receive the θ signal.

The permanent magnet motor 108 is controlled by generating $I_D$ and $I_Q$ current commands for the D and Q axes, respectively. The $I_D$ current command is used to control the magnetizing flux of the motor, while the $I_Q$ current command is used to control the motor torque. These current commands are then converted to $V_D$ and $V_Q$ voltage commands for the D and Q axes, respectively. The $V_D$ and $V_Q$ voltage commands define a voltage vector that is used to generate three-phase voltages for the permanent magnet motor 108.

The PI speed regulator 110 includes a combiner and a speed controller. As described above, the PI speed regulator 110 receives a commanded speed as the Speed Ref signal, as well as the Speed Estimate signal. The Speed Estimate signal represents feedback identifying an estimate of the actual speed of the permanent magnet motor 108. The PI speed regulator 110 generates a difference between the Speed Ref and Speed Estimate signals, which is a speed error signal. The PI speed regulator 110 uses the speed error signal to generate a current command for the motor.

The PI $I_Q$ regulator 112 includes a combiner and a regulator. $I_{SQ}$ is a feedback signal that represents a measurement of the actual current in the q axis. The PI $I_Q$ regulator 112 generates a difference between either the current command provided by the PI speed regulator 110 or $I_{SQ}$ Ref (depending on whether the permanent magnet motor system 100 is in open loop mode or closed loop mode), and $I_{SQ}$, as an error signal. The PI $I_Q$ regulator 112 uses this error signal to generate the voltage command $V_{SQRef}$ for the motor.

The PI $I_D$ regulator 114 includes a combiner and a regulator. $I_{SD}$ is a feedback signal that represents a measurement of the actual current in the q axis. The PI $I_D$ regulator 114 generates a difference between $I_{SD}$ Ref and $I_{SD}$ as an error signal. The PI $I_D$ regulator 114 uses this error signal to generate the voltage command $V_{SDRef}$ for the motor.

The inverse Park transform circuit 116 uses the $V_{SQRef}$, $V_{SDRef}$, and the θ signal or the Speed Ramp signal (depending on operation mode) to convert the time-invariant $V_{SQRef}$ and $V_{SDRef}$ signals into the time-dependent $V_{S\alpha Ref}$ and $V_{S\beta Ref}$ signals. The space-vector generator 118 uses the $V_{S\alpha Ref}$ and $V_{S\beta Ref}$ signals, which represent a two-phase voltage vector, to generate three-phase voltage signals $T_a$, $T_b$, and $T_c$. These three-phase voltage signals define the voltages to be applied to the "A," "B," and "C" windings of the stator 150 during the three phases of the permanent magnet motor 108. The PWM controller 120 converts the three-phase voltage signals $T_a$, $T_b$, and $T_c$ into PWM signals PWM1 A/B, PWM2 A/B, and PWM3 A/B for driving transistor switches in the three-phase inverter 106.

The FOC control circuitry 102 uses sensorless FOC to control the permanent magnet motor 108. That is, the FOC control circuitry 102 does not receive sensor measurements from sensors mounted in or on the permanent magnet motor 108. Rather, the FOC control circuitry 102 uses the BEMF waveform to infer one or more characteristics of the permanent magnet motor 108, such as rotor speed or rotor position. The BEMF waveform sensed by the sensors/ADC circuit 122 is dependent on the position and speed of the rotor 160. The BEMF waveform is caused by periodic changes of magnetic fluxes on the rotor 160. Magnetic fluxes are induced on the rotor 160 by the movement of the magnets of the rotor 160 with respect to the charged windings of the stator 150. The sensors/ADC circuit 122 uses both voltage and current information to obtain the BEMF waveform.

The permanent magnet motor 108 is a three-phase time-dependent and speed-dependent system. Accordingly, the signals provided by the sensors/ADC circuit 122 corresponding to measured BEMF represent data in a three-phase time-dependent and speed-dependent coordinate system. This coordinate system can be transformed via projection into a two-coordinate time-invariant synchronous system.

The Clarke transform circuit 124 transforms the time-dependent three phase (three dimensional) signals $I_{Sa}$, $I_{Sb}$, and $I_{Sc}$ into time-dependent two phase (two dimensional) signals Isa and $I_{S\beta}$. The Park transform circuit 128 transforms the time-dependent two phase signals Isa and $I_{S\beta}$ into time-invariant two phase signals using either the θ signal or the Speed Ramp signal (depending on the operating mode of the permanent magnet motor system 100). The two coordinate axes of outputs, $I_{SQ}$ and $I_{SD}$, of the Park transform circuit 128 and downstream signals (up to the inverse Park transform circuit 116) are referred to as the D and Q axes, as illustrated in FIG. 2. The phase voltage reconstruction circuit 126 uses PWM duty cycle information provided by $T_a$, $T_b$, and $T_c$, as well as DC voltage information measured by the sensors/ADC circuit 122, to determine output phase voltages. Output phase voltage is the voltage between a line from the three phase inverter 106 to the permanent magnet motor 108, and neutral. Output phase voltage is output by the phase voltage reconstruction circuit 126 as two phase voltage information ($V_{S\alpha}$ and $V_{S\beta}$).

The sliding-mode position estimator 130 and the speed estimator 132 use a cascaded observer-based estimation algorithm to respectively identify position and velocity estimates for the permanent magnet motor 108, including in noisy environments. The sliding-mode position estimator 130 uses two phase voltage information ($V_{S\alpha}$ and $V_{S\beta}$) received from the phase voltage reconstruction circuit 126, and two phase current information ($I_{S\alpha}$ and $I_{S\beta}$) received from the Clarke transform circuit 124, to determine an estimated rotor angular position θ. The speed estimator 132 uses the resulting θ signal to estimate the rate of change in the angular position of the rotor 160.

Figure 2A:
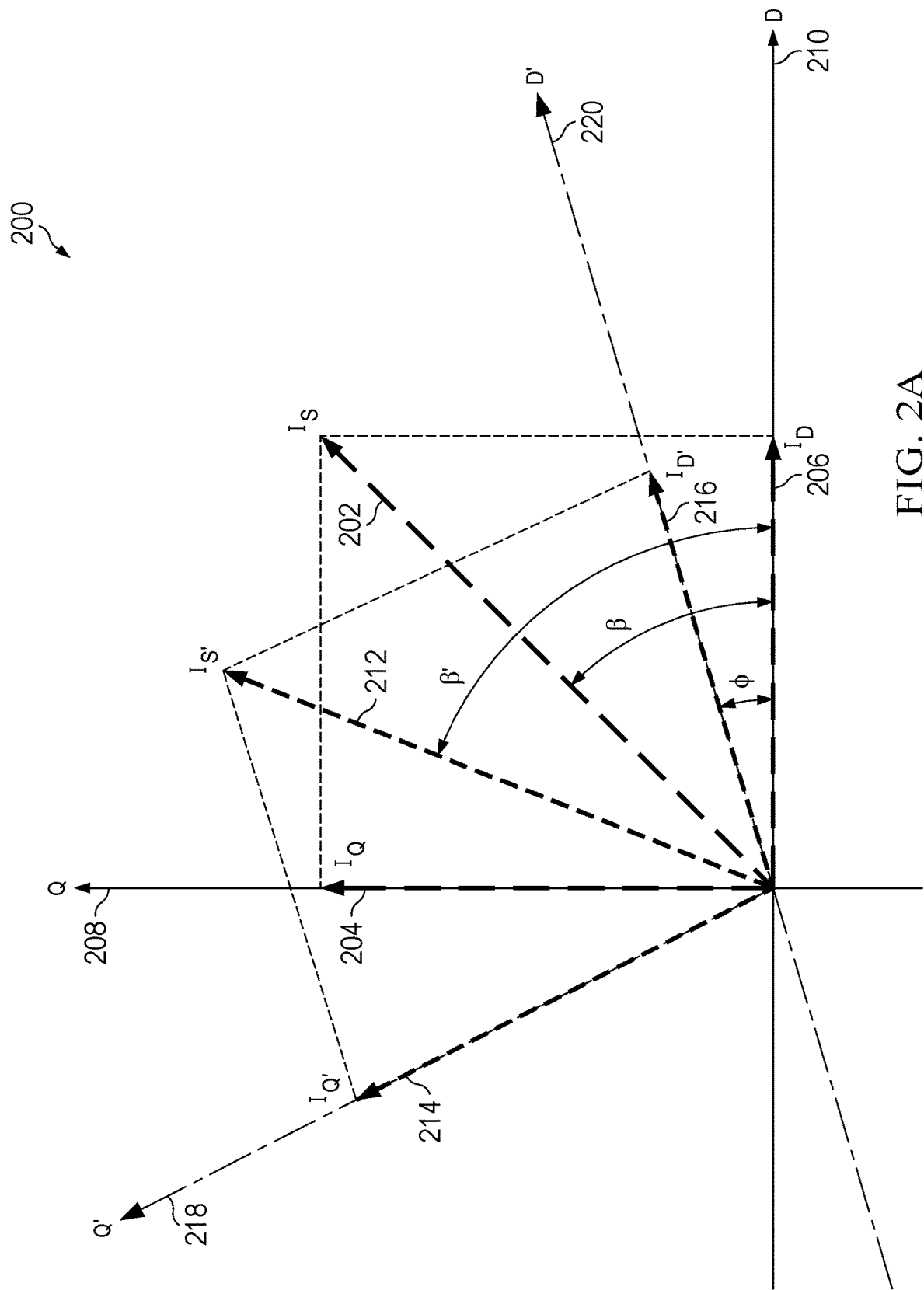
FIG. 2A is a graph illustrating an example transition of control of the permanent magnet motor by the FOC control circuitry from open loop mode to closed loop mode.

FIG. 2A is a graph 200 illustrating an example transition of control of the permanent magnet motor 108 by the FOC control circuitry 102 from open loop mode to closed loop mode. In some examples current vector $I_S$ 202 is used in control of the permanent magnet motor 108 during open loop operation. $I_S$ 202 is the sum of component current vectors $I_Q$ 204 and $I_D$ 206 ($I_Q$ and $I_D$ are further described above) in a Q-D coordinate system corresponding to the command rotor position. $I_Q$ 204 lies along the Q axis 208 and $I_D$ 206 lies along the D axis 210. The angle from the D axis 210 to $I_S$ 202 is β (beta).

After transition to closed loop mode, current vector $I_{S'}$ 212 (which can be read I-sub-S-prime) is used to control the permanent magnet motor 108. $I_{S'}$ 212 is the sum of component current vectors $I_{Q'}$ 214 and $I_{D'}$ 216 in a Q'-D' coordinate system corresponding to the estimated rotor position. $I_{Q'}$ 214 lies along the Q' axis 218 and $I_{D'}$ 216 lies along the D' axis 220. An angle ϕ (phi) is the angular difference between the command rotor position and the estimated rotor position. The angle from the D axis 210 to the D' axis 220 is ϕ, the angle from the D' axis 220 to $I_{S'}$ 212 is β, and the magnitudes of $I_{Q'}$ 214 and $I_{D'}$ 216 equal the magnitudes of $I_Q$ 204 and $I_D$ 206. In other words, $I_{Q'}$ 214 and $I_{D'}$ 216 are the same as $I_Q$ 204 and $I_D$ 206, rotated by ϕ. Accordingly, $I_{S'}$ 212 equals $I_S$ 202, rotated by ϕ. β' is the angle from $I_D$ 206 to $I_{S'}$ 212, which equals β plus ϕ. This means that, like $I_S$ 202, $I_{S'}$ 212 is a current vector determined using the command rotor position. As described above, the command rotor position and the estimated rotor position can be different, meaning that the change from $I_S$ 202 to $I_{S'}$ 212 may be sudden and significant.

Figure 2B:
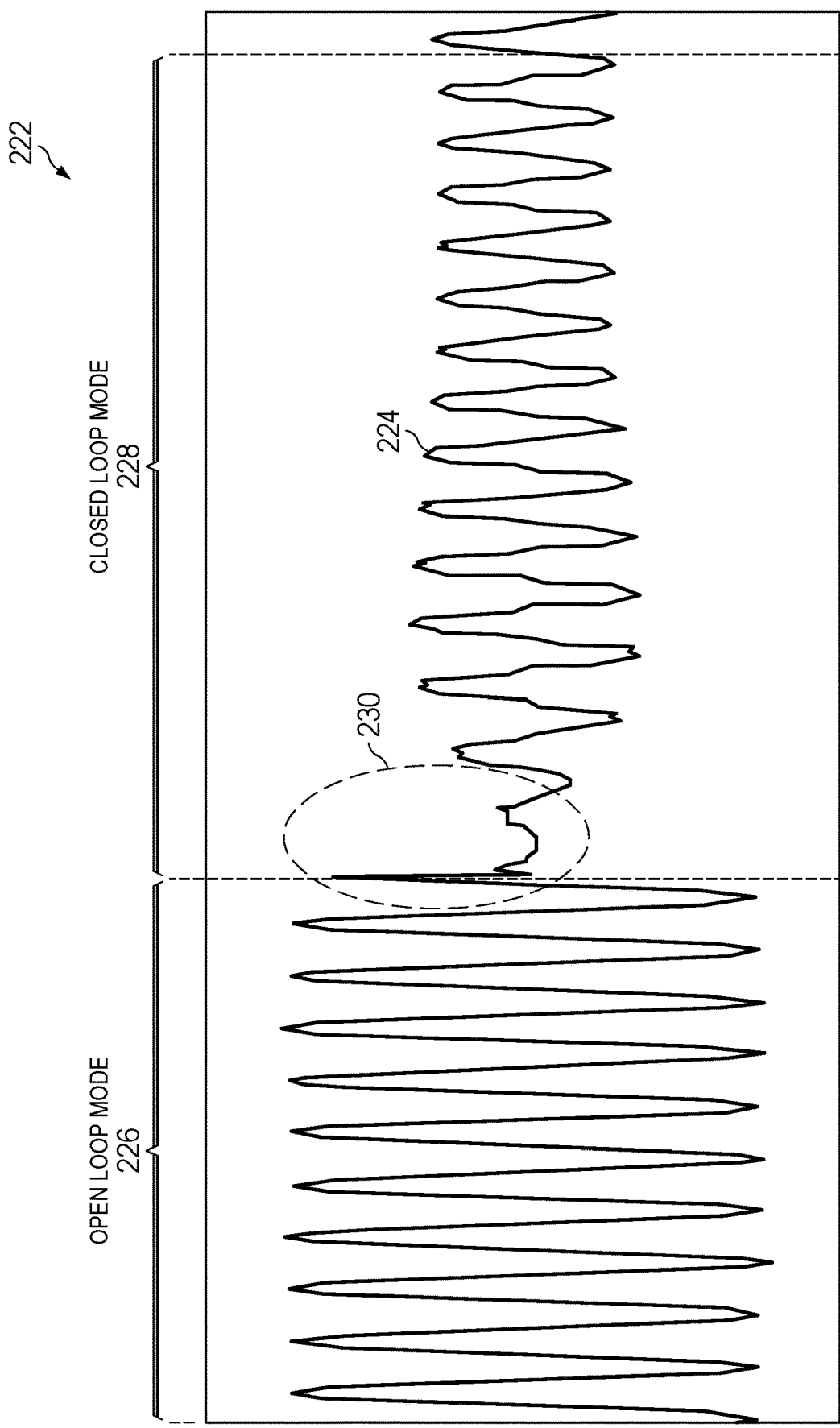
FIG. 2B is a graph illustrating an example waveform of a phase current during startup of the permanent magnet motor of FIG. 1 using control current vectors $I_S$ and Is' as described with respect to FIG. 2A.

FIG. 2B is a graph 222 illustrating an example waveform of a phase current 224 during startup of the permanent magnet motor 108 of FIG. 1 using control current vectors $I_S$ 202 and Is' 212 as described with respect to FIG. 2A. Phase current is the current sent to the permanent magnet motor 108 by the three phase inverter 106. The permanent magnet motor system 100 operates in open loop mode 226 until a transition to closed loop mode 228 occurs at T1. Following T1, there is a period of instability 230 in the phase current 224 caused by an incorrect rotating flux resulting from the sudden change in current vector. As described above, in some examples this can lead to one or more of inefficiency, reduction in motor performance quality, system damage, or motor start failure.

Figure 3A:
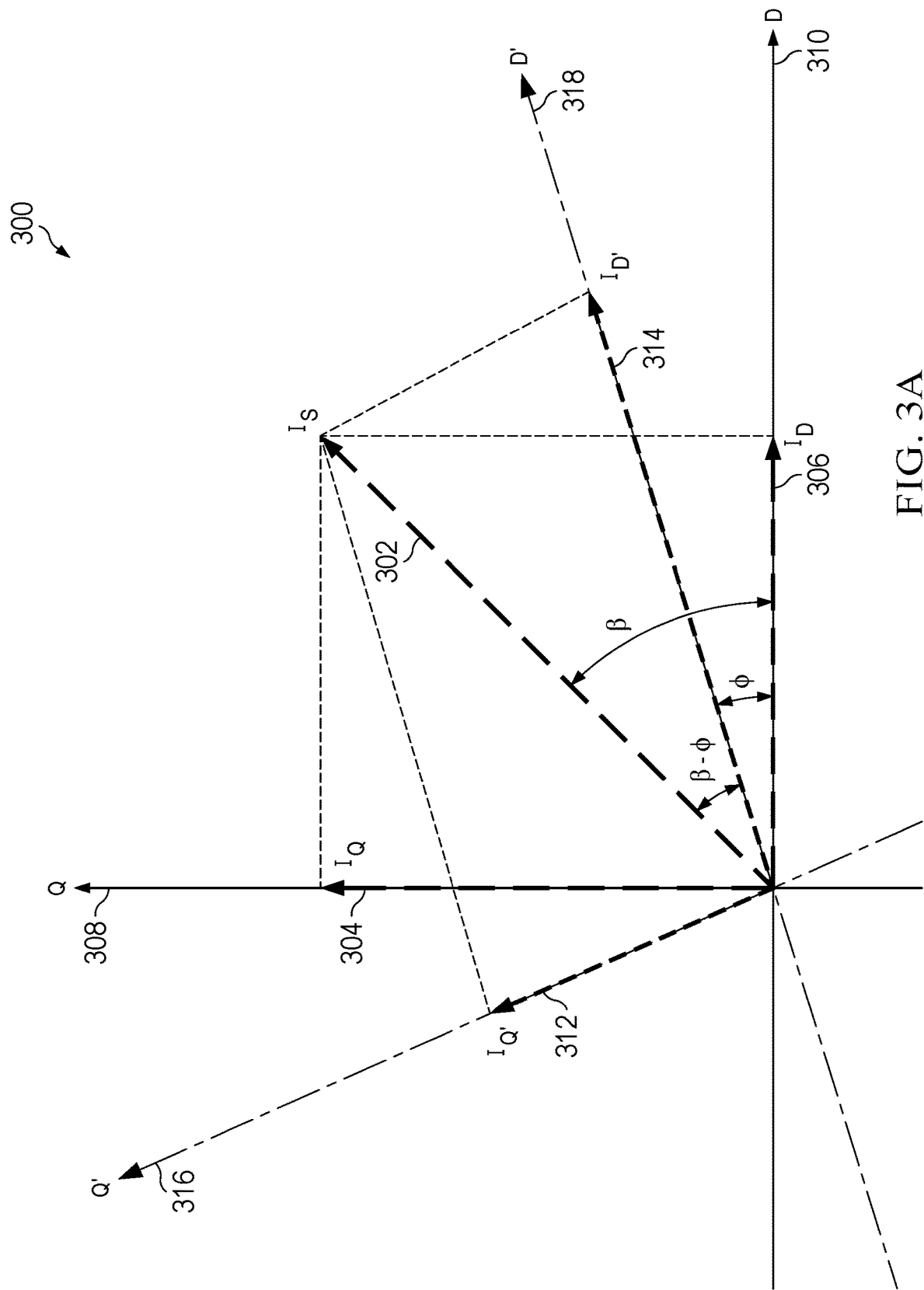
FIG. 3A is a graph illustrating an example transition of control of the permanent magnet motor by the FOC control circuitry from open loop mode to closed loop mode while holding constant the control current vector $I_S$ as applied to the permanent magnet motor 108.

FIG. 3A is a graph 300 illustrating an example transition of control of the permanent magnet motor 108 by the FOC control circuitry 102 from open loop mode to closed loop mode while holding constant the control current vector $I_S$ 302 as applied to the permanent magnet motor 108. In some examples $I_S$ 302 is used in control of the permanent magnet motor 108 during open loop operation. In open loop mode, $I_S$ 302 is the sum of component current vectors $I_Q$ 304 and $I_D$ 306. $I_Q$ 304 lies along the Q axis 308 and $I_D$ 306 lies along the D axis 310. The angle from the D axis 310 to $I_S$ 302 is β.

During transition to closed loop mode, the current vector applied to control the permanent magnet motor 108 is held constant. That is, $I_S$ 302 continues to be used to control the permanent magnet motor 108. In closed loop mode, $I_S$ 302 is the sum of component current vectors $I_{Q'}$ 312 and $I_{D'}$ 314. $I_{Q'}$ 312 lies along the Q' axis 316 and $I_{D'}$ 314 lies along the D' axis 318. The angle from the D axis 310 to the D' axis 318 is ϕ (phi), and the angle from the D' axis 318 to $I_S$ 302 is β minus ϕ. To maintain a constant current vector as applied to the permanent magnet during transition from open loop mode to closed loop mode, $I_{Q'}$ 312, $I_{D'}$ 314, and closed loop $I_S$ 302 are described by Equations 1 through 4. Equation 1 gives the magnitude of $I_{Sc}$ (closed loop Is) using $I_{So}$ (open loop Is), Equation 2 relates the magnitude of $I_S$ to the magnitudes of $I_{Q'}$ and $I_{D'}$, and Equations 3 and 4 together define a right triangle made up of the sides $I_{Sc}$, $I_{Q'}$, and $I_{D'}$:

$$|I_{So}| = \sqrt{|I_Q|^2 + |I_D|^2} \quad \text{Equation 1}$$

$$|I_{Sc}| = |I_{So}| \quad \text{Equation 2}$$

$$I_{Q'} = I_{Sc}\sin(\beta - \phi) \quad \text{Equation 3}$$

$$I_{D'} = I_{Sc}\cos(\beta - \phi) \quad \text{Equation 4}$$

Accordingly, as described by Equation 2, during transition to closed loop mode, the current vector $I_{So}$ (Is 302) is held constant to provide an initial, same $I_{Sc}$ (Is 302). This is done by changing the control vectors $I_D$ 306 and $I_Q$ 304 to the new control vectors $I_{D'}$ 314 and $I_{Q'}$ 312, as described by Equations 1, 3, and 4. After control of the permanent magnet motor 108 is changed from open loop operation to closed loop operation of the FOC control circuitry 102, the current vector used to control the permanent magnet motor 108 is allowed to change. New values of Is, following the transition to closed loop operation, are determined using estimated rotor position and estimated speed as provided by the sliding-mode position estimator 130 and the speed estimator 132, respectively.

FIG. 3B is a graph 322 illustrating an example waveform of a phase current 324 during startup of the permanent magnet motor 108 of FIG. 1, in which transition from open loop mode to closed loop mode uses constant control current vector $I_S$ 302 as described with respect to FIG. 3A. The permanent magnet motor system 100 operates in open loop mode 326 until the transition to closed loop mode 328 occurs at T1. Use of the constant current vector $I_S$ 302 to perform the open loop to closed loop control transition as described with respect to FIG. 3A results in a reduced or eliminated period of instability 230 with respect to the control transition described with respect to FIGS. 2A and 2B. Accordingly, corresponding potential performance degradation or system damage is also avoided.

Figure 4:
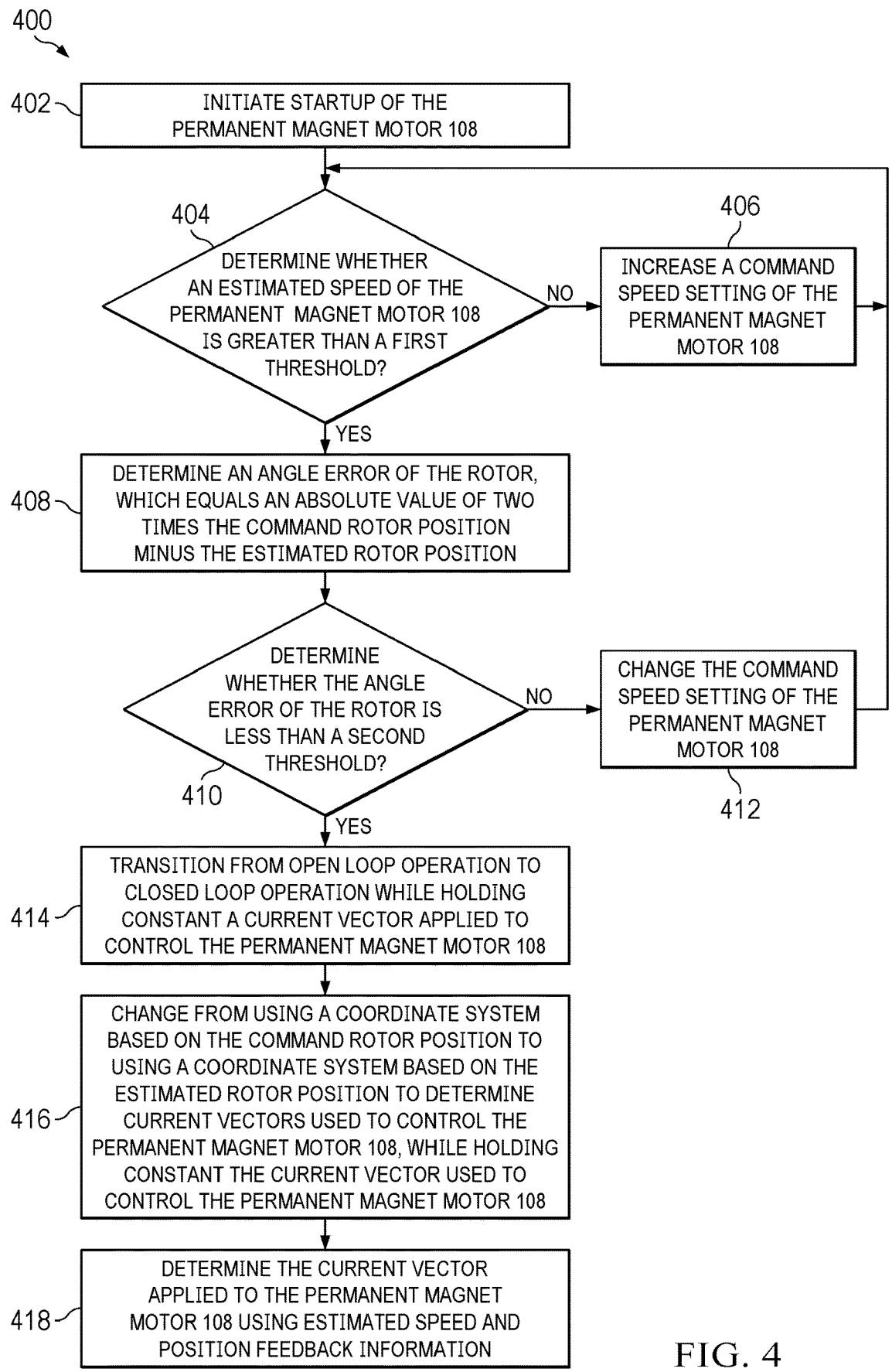
FIG. 4 is a process for transitioning from open loop operation to closed loop operation of the permanent magnet motor system 100 of FIG. 1.

FIG. 4 is a process 400 for transitioning from open loop operation to closed loop operation of the permanent magnet motor system 100 of FIG. 1. Steps of the process 400 are performed using the FOC control circuitry 102 to control the permanent magnet motor 108. In step 402, the FOC control circuitry 102 initiates startup of the permanent magnet motor 108. In step 404, if an estimated speed of the permanent magnet motor 108 is greater than a first threshold, the FOC control circuitry 102 proceeds to step 408, otherwise the FOC control circuitry 102 performs step 406. In step 406, the FOC control circuitry 102 increases (or decreases; i.e., modifies) a command speed setting of the permanent magnet motor 108. By looping through steps 404 and 406, the FOC control circuitry 102 may be configured to run the permanent magnet motor 108 over the first threshold (e.g., to a speed above the first threshold). In step 408, the FOC control circuitry 102 determines an angle error of the rotor 160, as described by Equation 5, in which ω is the command rotor position and ω' is the estimated rotor position:

$$\text{angle error} = |2\omega - \omega'| \quad \text{Equation 5}$$

Equation 5 is an example of how to determine the angle error. In other examples, the FOC control circuitry 102 may be configured to determine the angle error as a difference between the estimated and the force angle (e.g., the command position). In step 410, if the angle error is less than a second threshold, then the FOC control circuitry 102 proceeds to step 412, otherwise, the FOC control circuitry 102 proceeds to step 414. In some examples, the second threshold is less than or equal to 90 degrees ($\pi/2$ radians). In step 412, the FOC control circuitry 102 changes (increases or decreases) the command speed setting of the permanent magnet motor 108 and returns to step 404. Thus, the FOC control circuitry 102 may be configured to adjust the speed setting and repeat steps 404, 408, and 410. In some examples, the process returns to step 404 if the command speed setting is decreased, and to step 408 if the command speed setting is increased. In some examples, a floor is applied to the command speed setting after the process reaches step 408 (for example, a command speed setting equal to or greater than the first threshold), and the process returns to step 408. By increasing or decreasing the command speed setting, the permanent magnet motor 108 increases or decreases rotational speed of the rotor 160, which enables the angle error to change. Changing the speed setting causes the angle error to change in response to, for example, changing delay between the command rotor position and the actual rotor position, and changing accuracy of the estimated rotor position (in some examples, estimate accuracy improves as rotor speed increases).

In some examples, step 412 increases the command speed setting by default. If the angle error increases as the command speed setting is increased during an iteration of step 412, then the command speed setting is decreased in a subsequent iteration of step 412. Having a sufficiently low angle error enables a smoother transition from open loop mode to closed loop mode.

In step 414, the FOC control circuitry 102 transitions from open loop operation to closed loop operation while holding constant a current vector applied to control the permanent magnet motor 108. To change from open loop operation to closed loop operation, the FOC control circuitry 102 may be configured to keep the current vector constant algorithm based on coordinate transform theory. Transitioning from open loop operation to closed loop operation includes performing steps 416 and 418. In step 416, the FOC control circuitry 102 changes from using a coordinate system based on the command rotor position to using a coordinate system based on the estimated rotor position to determine current vectors used to control the permanent magnet motor 108, while holding constant the current vector used to control the permanent magnet motor 108. In step 418, the FOC control circuitry 102 determines the current vector applied to the permanent magnet motor 108 using estimated speed and position feedback information.

Use of the process 400 to transition from open loop operation to closed loop operation of the permanent magnet motor system 100 enables improved efficiency and reliability of the permanent magnet motor 108, and avoids damage. The process 400 may significantly improve the startup torque waveform. A system implementing the process 400 may experience benefits such as avoidance of overcurrent conditions and avoidance of rotor demagnetization. In addition, the system may experience less torque ripple, less voltage ripple, and lower total harmonic distortion.

In some examples, one or more of the functional blocks described with respect to the FOC control circuitry 102 are performed using software instructions stored in a memory and executed on a processor. The techniques described in this disclosure may be embodied or encoded in an article of manufacture including a non-transitory computer-readable storage medium. Example non-transitory computer-readable storage media may include random access memory (RAM), read-only memory (ROM), programmable ROM, erasable programmable ROM, electronically erasable programmable ROM, flash memory, a solid-state drive, a hard disk, magnetic media, optical media, or any other computer readable storage devices or tangible computer readable media. The term "non-transitory" may indicate that the storage medium is not embodied in a carrier wave or a propagated signal. In certain examples, a non-transitory storage medium may store data that can, over time, change (e.g., in RAM or cache).

In some examples, a motor other than a permanent magnet motor is used, such as an induction motor or a synchronous motor.

In some examples, one or more of the functional blocks described with respect to the FOC control circuitry 102 are performed using specialized hardware. For example, the FOC control circuitry 102 may include one or more processors. FOC control circuitry 102 may include any combination of integrated circuitry, discrete logic circuitry, analog circuitry, such as one or more microprocessors, microcontrollers, digital signal processors, application specific integrated circuits, central processing units, graphics processing units, field-programmable gate arrays, and/or any other processing resources. In some examples, the FOC control circuitry 102 may include multiple components, such as any combination of the processing resources listed above, as well as other discrete or integrated logic circuitry, and/or analog circuitry.

In some examples, some or all of the FOC control circuitry 102 is fabricated on an integrated circuit (IC).

In some examples, a voltage regulator other than a three phase inverter 106 is used to provide power to the permanent magnet motor 108. In some examples, a power supply other than a DC power supply is used to provide power to the voltage regulator used to power the permanent magnet motor 108.

The term "couple," as used in the specification, may cover connections, communications, or signal paths that enable a functional relationship consistent with this description. For example, if device A provides a signal to control device B to perform an action, in a first example device A is coupled to device B, or in a second example device A is coupled to device B through intervening component C if intervening component C does not substantially alter the functional relationship between device A and device B such that device B is controlled by device A via the control signal provided by device A.

In this description, the term "and/or" (when used in a form such as A, B and/or C) refers to any combination or subset of A, B, C, such as: (a) A alone; (b) B alone; (c) C alone; (d) A with B; (e) A with C; (f) B with C; and (g) A with B and with C. Also, as used herein, the phrase "at least one of A or B" (or "at least one of A and B") refers to implementations including any of: (a) at least one A; (b) at least one B; and (c) at least one A and at least one B.

A device that is "configured to" perform a task or function may be configured (e.g., programmed and/or hardwired) at a time of manufacturing by a manufacturer to perform the function and/or may be configurable (or re-configurable) by a user after manufacturing to perform the function and/or other additional or alternative functions. The configuring may be through firmware and/or software programming of the device, through a construction and/or layout of hardware components and interconnections of the device, or a combination thereof.

A circuit or device that is described herein as including certain components may instead be adapted to be coupled to those components to form the described circuitry or device. For example, a structure described as including one or more semiconductor elements (such as transistors), one or more passive elements (such as resistors, capacitors, and/or inductors), and/or one or more sources (such as voltage and/or current sources) may instead include only the semiconductor elements within a single physical device (e.g., a semiconductor die and/or integrated circuit (IC) package) and may be adapted to be coupled to at least some of the passive elements and/or the sources to form the described structure either at a time of manufacture or after a time of manufacture, for example, by an end-user and/or a third-party.

While certain elements of the described examples may be included in an integrated circuit and other elements are external to the integrated circuit, in other example embodiments, additional or fewer features may be incorporated into the integrated circuit. In addition, some or all of the features illustrated as being external to the integrated circuit may be included in the integrated circuit and/or some features illustrated as being internal to the integrated circuit may be incorporated outside of the integrated circuit. As used herein, the term "integrated circuit" means one or more circuits that are: (i) incorporated in/over a semiconductor substrate; (ii) incorporated in a single semiconductor package; (iii) incorporated into the same module; and/or (iv) incorporated in/on the same printed circuit board.

Uses of the phrase "ground" in the foregoing description include a chassis ground, an Earth ground, a floating ground, a virtual ground, a digital ground, a common ground, and/or any other form of ground connection applicable to, or suitable for, the teachings of this description. Unless otherwise stated, "about," "approximately," or "substantially" preceding a value means +/−10 percent of the stated value, or, if the value is zero, a reasonable range of values around zero. Modifications are possible in the described examples, and other examples are possible within the scope of the claims.

What is claimed is:

1. A device comprising:
a processor; and
a non-transitory memory storing instructions that, when executed, cause the processor to:
operate in an open loop mode a motor that includes a rotor and a stator;
determine an angle error of the rotor;
in response to the angle error of the rotor being less than a threshold, transition from operating the motor in the open loop mode to operating the motor in a closed loop mode by:
changing from using a first coordinate system based on a command rotor position to using a second coordinate system based on an estimated rotor position to determine current vectors used to control the motor; and
holding constant a current vector used to control the motor while performing the changing action; and
after performing the changing and holding actions, operate the motor in the closed loop mode.

2. The device of claim 1, wherein the instructions to determine the angle error comprise instructions to determine an absolute value of two times the command rotor position minus the estimated rotor position.

3. The device of claim 1, the non-transitory memory further including instructions that, when executed, cause the processor to modify a speed setting of the rotor in response to the angle error of the rotor being greater than the threshold.

4. The device of claim 1, wherein the instructions to operate in the closed loop mode comprise instructions to determine a current vector to be applied to the motor using an estimated speed determined using a sliding-mode observer.

5. The device of claim 1, wherein the threshold is a first threshold, and the non-transitory memory further including instructions that, when executed, cause the processor to, prior to the determining action:
increase a speed of the rotor;
proceed to the determining action in response to the speed of the rotor being greater than a second threshold;
repeat the increasing action in response to the speed of the rotor being less than the second threshold.

6. The device of claim 1, wherein the instructions to operate in the closed loop mode comprise instructions to determine the estimated rotor position using a sliding-mode observer.

7. The device of claim 1, wherein the threshold is less than 90 degrees.

8. A system comprising:
a power supply including an output;
an inverter regulator including a power input, a power output, and a control input;
a motor including a power input, wherein the motor includes a rotor and a stator;
a field oriented control (FOC) circuit including an input, an output, a processor, and a non-transitory memory storing instructions that, when executed, cause the processor to:
operate the motor in an open loop mode;
determine an angle error of the rotor;
in response to the angle error of the rotor being less than a threshold, transition from operating the motor in the open loop mode to operating the motor in a closed loop mode by:
changing from using a first coordinate system based on a command rotor position to using a second coordinate system based on an estimated rotor position to determine current vectors used to control the motor; and
holding constant a current vector used to control the motor while performing the changing action; and
after performing the changing and holding actions, operate the motor in the closed loop mode.

9. The system of claim 8,
wherein the power supply is a direct-current (DC) power source, and
wherein the inverter is a three phase inverter.

10. The system of claim 8, wherein the instructions to determine the angle error comprise instructions to determine an absolute value of two times the command rotor position minus the estimated rotor position.

11. The system of claim 8, the non-transitory memory further including instructions that, when executed, cause the processor to increase a speed setting of the rotor in response to the angle error of the rotor being greater than the threshold.

12. The system of claim 8, wherein the instructions to operate in the closed loop mode comprise instructions to determine a current vector to be applied to the motor using an estimated speed determined using a sliding-mode observer.

13. The system of claim 8, wherein the threshold is a first threshold, and the non-transitory memory further including instructions that, when executed, cause the processor to, prior to the determining action:
increase a speed of the rotor;
proceed to the determining action in response to the speed of the rotor being greater than a second threshold;
repeat the increasing action in response to the speed of the rotor being less than the second threshold.

14. The system of claim 8, wherein the instructions to operate in the closed loop mode comprise instructions to determine the estimated rotor position using a sliding-mode observer.

15. A method of controlling a motor that includes a rotor and a stator, the method comprising:
operating the motor in an open loop mode;
determining an angle error of the rotor;
in response to the angle error of the rotor being greater than a threshold, transitioning from operating the motor in the open loop mode to operating the motor in a closed loop mode by:
changing from using a first coordinate system based on a command rotor position to using a second coordinate system based on an estimated rotor position to determine current vectors used to control the motor; and
holding constant a current vector used to control the motor while performing the changing; and
after performing the changing and the holding, operating the motor in the closed loop mode.

16. The method of claim 15, wherein the determining the angle error comprises determining an absolute value of two times the command rotor position minus the estimated rotor position.

17. The method of claim 15, further comprising modifying a speed setting of the rotor in response to the angle error of the rotor being greater than the threshold.

18. The method of claim 15, the operating in the closed loop mode comprises determining a current vector to be applied to the motor using an estimated speed determined using a sliding-mode observer.

19. The method of claim 15, wherein the threshold is a first threshold, further comprising, prior to the determining:
increasing a speed of the rotor;
proceeding to the determining in response to the speed of the rotor being greater than a second threshold;
repeating the increasing in response to the speed of the rotor being less than the second threshold.

20. The method of claim 15, wherein the operating in the closed loop mode comprises determining the estimated rotor position using a sliding-mode observer.

* * * * *